(12) United States Patent
Otake (10) Patent No.: US 11,108,930 B2
(45) Date of Patent: Aug. 31, 2021

(54) IMAGE READING UNIT AND IMAGE READING APPARATUS

(71) Applicant: CANON KABUSHIKI KAISHA, Tokyo (JP)

(72) Inventor: Akira Otake, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/797,245

(22) Filed: Feb. 21, 2020

(65) Prior Publication Data
US 2020/0296250 A1 Sep. 17, 2020

(30) Foreign Application Priority Data

Mar. 13, 2019 (JP) .............................. JP2019-046512
Nov. 28, 2019 (JP) .............................. JP2019-215856

(51) Int. Cl.
*H04N 1/04* (2006.01)
*H04N 1/193* (2006.01)
*H04N 1/028* (2006.01)

(52) U.S. Cl.
CPC ....... *H04N 1/1938* (2013.01); *H04N 1/02895* (2013.01); *H04N 1/1937* (2013.01)

(58) Field of Classification Search
None
See application file for complete search history.

(56) References Cited

U.S. PATENT DOCUMENTS

| 5,675,431 | A | * | 10/1997 | Bock | G02B 7/182 |
| | | | | | 359/216.1 |
| 5,780,841 | A | * | 7/1998 | Bakker | H04N 1/02815 |
| | | | | | 250/208.1 |
| 6,216,952 | B1 | * | 4/2001 | Mou | G06K 7/10693 |
| | | | | | 235/455 |
| 6,400,484 | B1 | * | 6/2002 | Wang | G02B 26/10 |
| | | | | | 358/474 |
| 6,494,374 | B1 | * | 12/2002 | Wang | H04N 1/00681 |
| | | | | | 235/459 |
| 6,594,374 | B1 | * | 7/2003 | Beckstrom | G07B 17/00508 |
| | | | | | 382/101 |
| RE41,308 | E | * | 5/2010 | Huang | H04N 1/1043 |
| | | | | | 362/297 |
| 8,174,738 | B2 | * | 5/2012 | Ono | H04N 1/03 |
| | | | | | 250/208.1 |
| 8,300,278 | B2 | * | 10/2012 | Uchida | H04N 1/03 |
| | | | | | 358/474 |
| 2005/0063025 | A1 | * | 3/2005 | Hayashide | H04N 1/00031 |
| | | | | | 358/497 |
| 2008/0158533 | A1 | * | 7/2008 | Shimizu | G03B 27/70 |
| | | | | | 355/66 |

(Continued)

FOREIGN PATENT DOCUMENTS

| JP | 11095147 | A | * | 4/1999 |
| JP | 11149053 | A | * | 6/1999 |
| JP | 2016-005090 | | | 1/2016 |

*Primary Examiner* — Cheukfan Lee
(74) *Attorney, Agent, or Firm* — Venable LLP (57) ABSTRACT

An image reading unit includes an illumination portion, a reading portion, a casing, and a reflection member including a reflecting surface. The casing is provided with an opening. The reflection member is held outside of the opening of the casing so that at least a part of the reflecting surface is exposed to the inside of the casing through the opening.

17 Claims, 10 Drawing Sheets (56) References Cited

U.S. PATENT DOCUMENTS

| | | | |
|---|---|---|---|
| 2008/0224043 A1* | 9/2008 | Roberts | G01N 21/958 250/338.1 |
| 2008/0291552 A1* | 11/2008 | Nogami | G02B 7/182 359/736 |
| 2010/0277773 A1* | 11/2010 | Lai | H04N 1/0303 358/474 |
| 2013/0293932 A1* | 11/2013 | Sugai | G03G 15/605 358/406 |
| 2014/0300936 A1* | 10/2014 | Yang | H04N 1/0285 358/475 |
| 2015/0365556 A1 | 12/2015 | Imoto et al. | H04N 1/02895 |
| 2019/0268495 A1 | 8/2019 | Otake | H04N 1/02835 |

\* cited by examiner

IMAGE READING UNIT AND IMAGE READING APPARATUS

FIELD OF THE INVENTION AND RELATED ART

The present invention relates to an image reading unit for reading image information from an object and an image reading apparatus for reading image information from a sheet.

The image reading unit for use with a document scanner or a copying machine reads image information from an original by irradiating the original with light and by photoelectrically converting an image formed on an imaging (image pick-up) device with reflected light from the original into the image information. In the case where a charge coupled device (CCD) is used as the imaging device, a normal optical path for guiding the reflected light from the original to the imaging device while repetitively reflecting the reflected light by a plurality of reflection members provided in a casing of the image reading unit is formed. When light (stray light) reaching the imaging device without travelling along the normal optical path exists, there is a liability that a phenomenon such that noise generates in the read image information (flare) or double reflection (ghost) of the image occurs.

In order to reduce the stray light, countermeasures such that the casing is formed in a black color or that hermeticity of the casing is enhanced so as not to take in light other than the reflected light from the original to the extent possible have been taken. Japanese Laid-Open Patent Application (JP-A) 2016-5090 discloses a constitution in which a light blocking portion is provided between a light guiding member for guiding light from a light source toward the original and a first reflecting mirror for reflecting the light from the original in the neighborhood of the light guiding member and thus the light tending to enter an inside of a scanner unit is blocked.

As a method of reducing the stray light, it would be considered that a light blocking member is provided at a periphery of a reflecting surface of a reflection member and a light beam deviated from a normal optical path is blocked by the light blocking member. However, there is a liability that a cost and a size of an apparatus (device) are increased by additionally providing the light blocking member.

SUMMARY OF THE INVENTION

A principal object of the present invention is to provide an image reading unit capable of reducing stray light by a simple constitution.

According to an aspect of the present invention, there is provided an image reading unit comprising: an illumination portion configured to illuminate an object with light; a reading portion configured to read image information of the object by photoelectrically converting reflected light from the object illuminated with the light by the illumination portion; a casing configured to hold the reading portion and provided with an entrance through which the light reflected by the object passes; and a reflection member including a reflecting surface for reflecting the reflected light passed through the entrance and configured to form an optical path for guiding the reflected light from the object to the image reading portion, wherein the casing is provided with an opening, and wherein the reflection member is held outside of the opening of the casing so that at least a part of the reflecting surface is exposed to the inside of the casing through the opening.

Further features of the present invention will become apparent from the following description of exemplary embodiments with reference to the attached drawings.

BRIEF DESCRIPTION OF THE DRAWINGS

Part (a) of FIG. 9 is a schematic view showing a positional relationship between a reflection region of the second mirror and a reflection region of the third mirror, and (b) of FIG. 9 is a schematic view showing a modified embodiment of this embodiment.

DESCRIPTION OF EMBODIMENTS

In the following, an exemplary embodiment for carrying out the present invention will be described with reference to the drawings.

Figure 1:
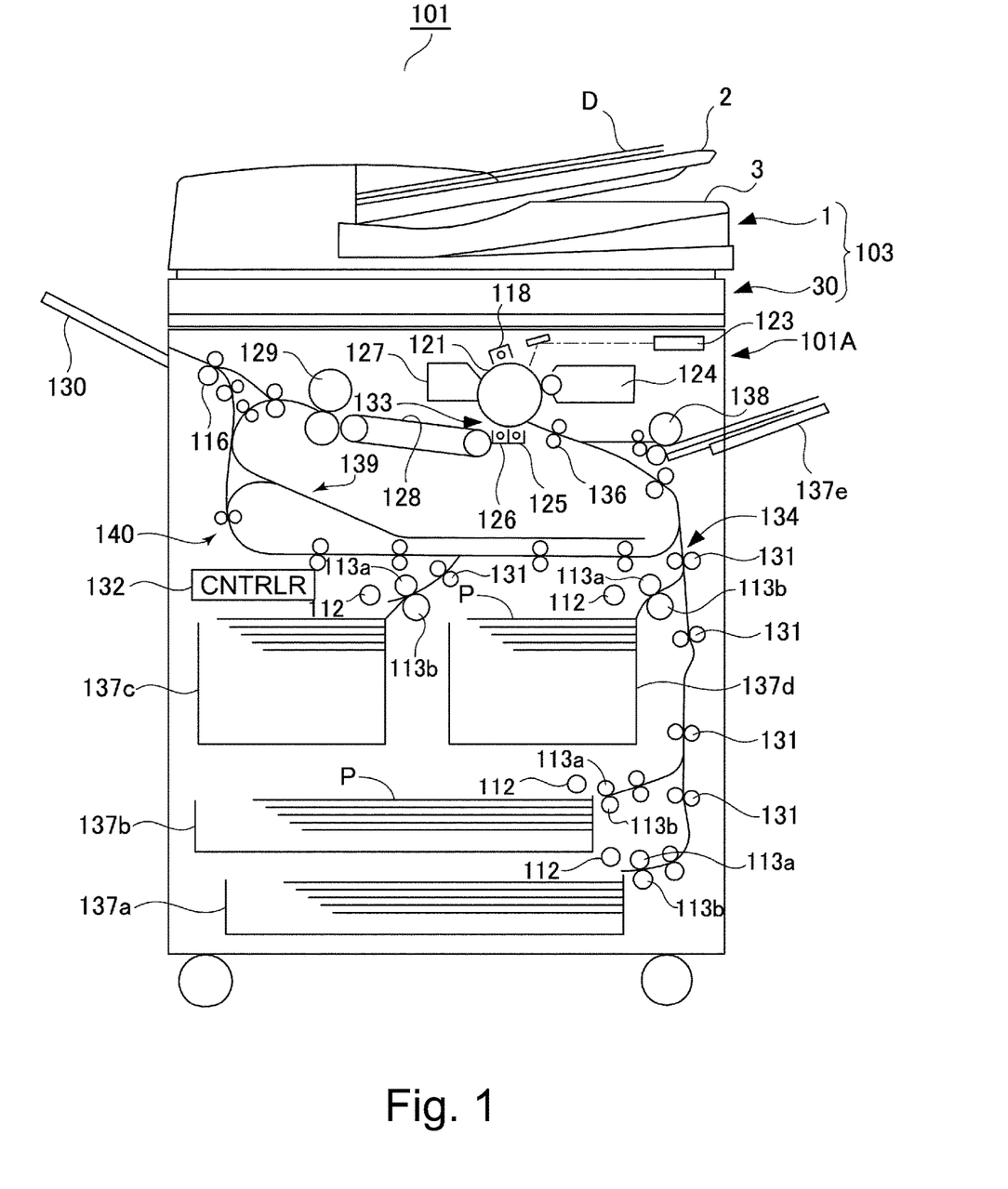
FIG. 1 is a schematic view of a printer according to an embodiment of the present invention.

First, a general structure of a printer 101 which is an image forming apparatus of this embodiment will be described with reference to FIG. 1. The printer 101 includes a printer main assembly 101A and an image reading apparatus 103 as shown in FIG. 1. The image reading apparatus 103 provided on the printer main assembly 101A includes a main body unit 30 and an ADF (automatic document feeder) 1 as described specifically later and reads image information by optically scanning an original D. The original D is a sheet including paper such as a sheet or an envelope, a plastic film such as a sheet for an overhead projector (OHT), a cloth, or the like. The image information converted into an electrical signal by the image reading apparatus 103 is transferred to a controller 132 provided in the printer main assembly 101A.

The printer main assembly 101A includes an image forming portion 133 for forming an image on a sheet P which is a recording material (medium) and a sheet feeding portion 134 for feeding the sheet P to the image forming portion 133. The sheet feeding portion 134 includes sheet accommodating portions 137a, 137b, 137c and 137d capable of accommodating sheets different in size from each other. The sheets accommodated in each of the sheet accommodating portions are fed by a pick-up roller 112 and separated one by one by a feed roller 113a and a retard roller 113b, and then is delivered to a corresponding feeding roller pair 131. Then, the sheet P is successively delivered to a plurality of feeding roller pairs 131 provided along a sheet feeding path, and then is fed toward a registration roller pair 136.

Incidentally, the sheet P placed on a manual feeding tray 137e by the user is fed to an inside of the printer main assembly 101A by a feeding roller 138 and then is fed toward the registration roller pair 136. The registration roller pair 136 not only corrects oblique movement of the sheet P by stopping a leading end of the sheet P but also resumes feeding of the sheet P in synchronism with progress of an image forming operation which is a toner image forming process by the image forming portion 133.

The image forming portion 133 for forming the image on the sheet P is an image forming unit of an electrophotographic type in which a photosensitive drum 121 which is a photosensitive member. The photosensitive drum 121 is rotatable along a feeding direction of the sheet P, and at a periphery of the photosensitive drum 121, a charger 118, an exposure device 123, a developing device 124, a transfer charger 125, a separation charger 126 and a cleaner 127 are provided. The charger 118 electrically charges a surface of the photosensitive drum 121, and the exposure device 123 exposes the photosensitive drum 121 to light on the basis of the image information inputted from the image reading apparatus 103 or the like, so that an electrostatic latent image is formed on the photosensitive drum 121.

The developing device 124 accommodates a developer containing toner and develops the electrostatic latent image into a toner image by supplying charged toner to the photosensitive drum 121. The toner image carried on the photosensitive drum 121 is transferred onto the sheet P fed from the registration roller pair 136, by a bias electric field formed by the transfer charger 125. The sheet P on which the toner image is transferred is spaced from the photosensitive drum 121 by a bias electric field formed by the separation charger 126 and then is fed toward a fixing portion 129 by a pre-fixing feeding portion 128. Incidentally, a deposited matter such as a transfer residual toner or the like remaining on the photosensitive drum 121 without being transferred onto the photosensitive drum 121 is removed by the cleaner 127, and the photosensitive drum 121 prepares for a subsequent image forming operation.

The sheet P fed to the fixing portion 129 is subjected to a fixing process including pressing and heating while being nipped and pressed by a roller pair. As a result, an image is fixed on the sheet P by melting and then fixing of the toner on the sheet P. In the case where image output is completed, the sheet P on which a fixed image is obtained is discharged through a discharging roller pair 116 onto a discharge tray 130 projecting toward an outside of the printer main assembly 101A. In the case where the image is formed on a back surface of the sheet P in double-side printing, the sheet P passed through the fixing portion 129 is turned upside down by a reversing portion 139, and is fed toward the registration roller pair 136 through a feeding path 140 for the double-side printing. Then, the sheet P on which the image is formed again by the image forming portion 133 is discharged onto the discharge tray 130.

The image forming portion 133 is an example of an image forming means, and for example, an image forming unit of an ink jet type or a printing mechanism of an offset printing type may also be used as the image forming means.

(Image Reading Apparatus)

Next, with reference to FIGS. 1 to 3, a structure of the image reading apparatus 103 will be described. As shown in FIG. 1, the ADF 1 feeds the original D, placed on an original feeding tray 2, toward an original discharge tray 3. The ADF 1 is openable relative to the main body unit 30, and the main body unit 30 is fixed to the printer main assembly 101A.

Figure 2:
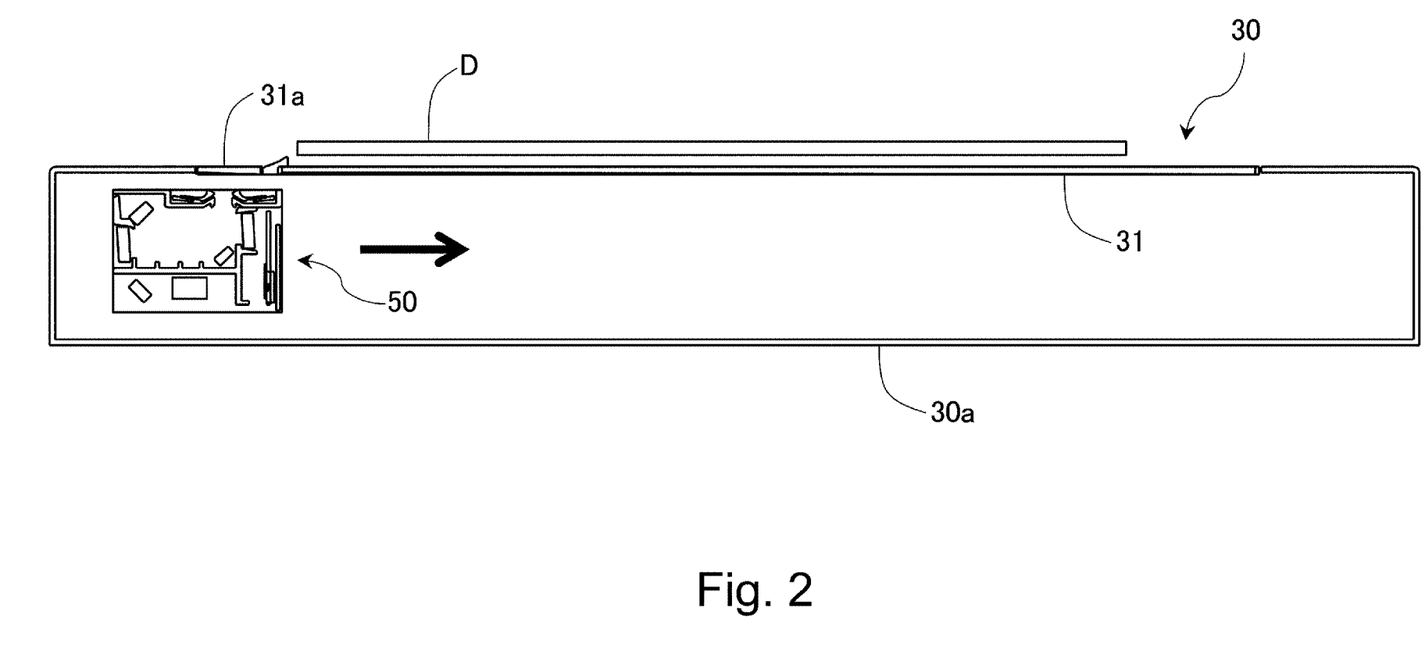
FIG. 2 is a schematic view showing a main body of a scanner of an image reading apparatus.

The main body unit 30 includes, as shown in FIG. 2, a frame 30a also functioning as an outer casing member, and at an upper surface of the frame 30a, an original supporting platen glass 31 and a platen glass 31a are provided. The original supporting platen glass 31 is stacking table in this embodiment. Inside the frame 30a, a scanner unit 50 is held. The scanner unit 50 is configured to be movable in parallel to the original supporting platen glass 31 by an unshown wire or belt driven by a motor.

Figure 3:
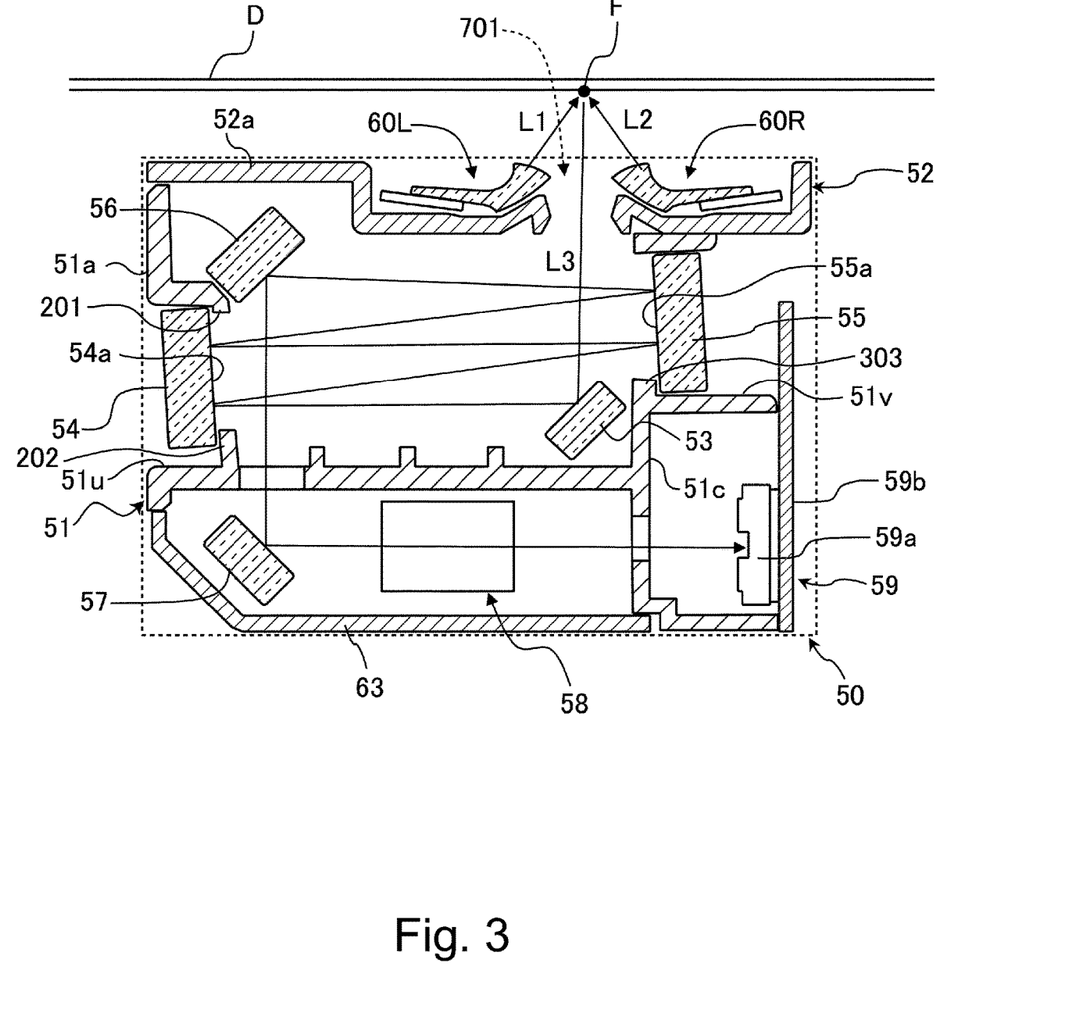
FIG. 3 is a schematic view showing a cross-sectional structure of a scanner unit.

The scanner unit 50 is an image reading unit of a CCD (Charge Coupled Device) type as shown in FIG. 3. The scanner unit 50 includes a box frame 51, an illumination unit 52, a first mirror 53, a second mirror 54, a third mirror 55, a fourth mirror 56, a fifth mirror 57, a lens unit 58 and a CCD substrate 59. On the CCD substrate 59, a CCD 59a which is an example of an imaging (image pick-up) device is arranged along a main scan direction. The illumination unit 52 is an illumination portion in this embodiment, and the CCD 59a is a reading portion in this embodiment. Incidentally, in this embodiment, the CCD 59a is used as the example of the imaging device, but it is also possible to use an imaging device using CMOS (complementary metal oxide semiconductor).

The illumination unit 52 is mounted above the box frame 51 of the scanner unit 50. The illumination unit 52 includes an illumination frame 52, unshown light emitting elements (for example, light emitting diodes), and two light guide units 60L and 60R. An original D as an object subjected to reading of image information is irradiated with light L1 and light L2 which are emitted by the light emitting elements in a state in which they are uniformly diffused in the main scan direction by the light guide units 60L and 60R. The illumination frame 52a constituting a casing (frame) of the scanner unit 50 in cooperation with the box frame 51 is provided with an entrance (opening) 701. The entrance 701 permitting entrance of reflected light from the object into the scanner unit 50 is not limited to the opening of the casing, but may also be constituted by a transparent member such as glass.

A position at which the light emitted from the light guide units 60L and 60R is concentrated on a reading surface is referred to as an "original irradiation (illumination) position F". A sub-scan direction is a direction perpendicular to the main scan direction and is a movement direction of the scanner unit 50 in this embodiment when the scanner unit 50 moves below the original supporting platen glass 31. Further, the reading surface refers to a phantom (virtual) flat surface extending at a predetermined height (an object point position of an optical system) where the scanner unit 50 is capable of performing reading of image information with high accuracy with respect to a height direction (direction of depth of field) perpendicular to the main scan direction and the sub-scan direction. The reading surface in this embodiment corresponds to, for example, a lower surface of the original D in a state in which the original D is left at rest on the original supporting platen glass 31.

The light reflected by the original D travels toward an inside of the scanner unit 50 through the entrance (opening) 701. The light traveled to the inside of the scanner unit 50 through the entrance 701 is reflected by the mirrors 53 to 57. The five (first to fifth) mirrors 53 to 57 and the lens unit 58 form an optical path for guiding the reflected light from the original D to the CCD substrate 59. As the respective mirrors 53 to 57 which are examples of a reflection member, for example, mirrors each provided with a reflecting surface prepared by forming an aluminum deposition film on a supporting member such as glass are used. The reflected light (light beam L3) reflected by the original D at the original irradiation position F travels through the first mirror 53, the second mirror 54, the third mirror 55, the fourth mirror 56, the fifth mirror 57 and the lens unit 58 and is focused as an image on the CCD 59a.

The CCD 59a receives the light beam L3 and photoelectrically converts the light beam L3 into an electric signal representing an image of the original D. Image information read by the CCD 59a is transmitted to a controller 132 and is used for image formation by the image forming portion 133.

In the following, a path of the light, of scattered light reflected by the original D, travelling through the first mirror 53, the second mirror 54, the third mirror 55, the fourth mirror 56, the fifth mirror 57 and the lens unit 58 and reaching the CCD 59a is referred to as an "normal optical path". The light beam L3 shown in FIG. 3 is a light beam which represents a pencil of light (ray bundle) delivered from the original irradiation position F and reaching the CCD 59a through the normal optical path. Further, the light reaching the CCD 59a along a path deviated from the normal optical path is referred to as stray light. An example of the stray light includes a light beam entering the inside of the scanner unit 50 through a portion other than the entrance 701 (the opening between the light guide units 60R and 60L) of the scanner unit 50 opposing the original irradiation position F. Further, a light beam passing through the opening of the scanner unit 50 opposing the original irradiation position F and is scattered by the box frame 51 by being deviated from a reflection region of any of the mirrors can results in the stray light.

A space inside the box frame 51 is covered at an upper portion thereof with the illumination frame 52a of the illumination unit 52 and is covered at a lower portion thereof with a lower cover 63. Further, as seen in the main scan direction, the CCD 59a is disposed in a space defined by a recessed portion provided on the box frame 51 and a substrate main body 59b of the CCD substrate 59.

Further, the box frame 51 is reflection region with a first opening 51b and a second opening 51d which are described later and which are closed by the second mirror 54 and the third mirror 55, respectively. Accordingly, the second mirror 54 and the third mirror 55 in this embodiment constitute a part of the outer casing partitioning the inside and the outside of the scanner unit 50 in cooperation with the box frame 51, the illumination frame 52a of the illumination unit 52, the lower cover 63 and the substrate main body 59b. The inside of the scanner unit 50 is a space in which the normal optical path and the reading portion and accommodated. However, the structure of the casing illustrated is merely an example, and a shape and an arrangement of the casing can be appropriately changed.

The thus-constituted image reading apparatus 103 reads image information from a sheet as the original D in a skimming (through) mode in which an original image is scanned while feeding the original D by the ADF 1 and in a fixedly reading mode in which the original placed on the original supporting platen glass 31 is scanned.

The skimming mode is selected in the case where the image reading apparatus detects the original D placed on the original feeding tray 2 or in the case where the user explicitly provides an instruction through the operating panel or the like of the printer main assembly 101A. In this case, in a state in which the scanner unit 50 is positioned below the platen glass 31a, the ADF 1 feeds the original D, placed on the original feeding tray 2, one by one, and then, the scanner unit 50 reads the image information from the fed original D. That is, in the skimming mode, the original D is scanned by being fed in the sub-scan direction relative to the scanner unit 50 of which position is fixed.

On the other hand, the fixedly reading mode is selected in the case where the image reading apparatus detects the original D placed on the original supporting platen glass 31 or in the case where the user explicitly provides an instruction through the operating panel or the like of the printer main assembly 101A. In the case of the fixedly reading mode, first, the user opens the ADF 1 and places the original on the original supporting platen glass 31 and closes the ADF 1, so that the original is positioned relative to the original supporting platen glass 31. Then, the scanner unit 50 reads the image information from the original D placed on the original supporting platen glass 31 while moving along the original supporting platen glass 31. That is, in the fixedly reading mode, the scanner unit 50 scans the original D while moving in the sub-scan direction relative to the original D which is positionally fixed.

Incidentally, the scanner unit 50 may also be mounted in an image reading apparatus capable of executing an operation in only one of the skimming mode and the fixedly reading mode. Further, by additionally providing the scanner unit 50 inside the ADF 1, and the image information may also be read by the two scanner units from both sides (surfaces) of the original D fed by the ADF 1.

(Second Mirror)

Figure 4:
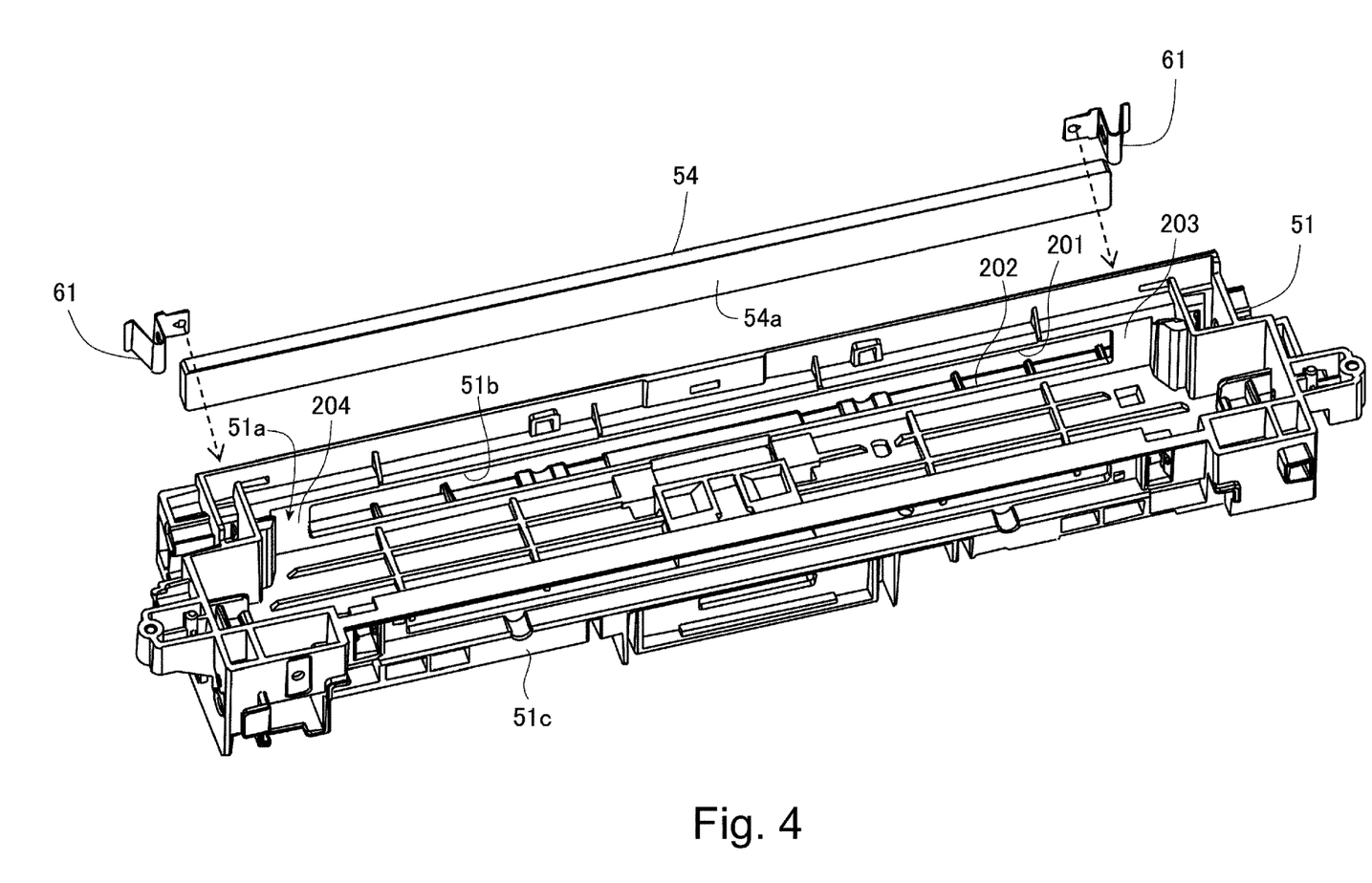
FIG. 4 is a perspective view for illustrating a mounting method of a second mirror.

A mounting structure of the mirrors disposed in the scanner unit 50 will be described. First, the second mirror 54 which is an example of the reflection member will be described. The box frame 51 is provided with the first opening 51b at one side wall portion 51a with respect to the sub-scan direction as shown in FIG. 4. The first opening 51b is a hole penetrating through the scanner unit 50 from the inside to the outside of the scanner unit 50 and is formed in a rectangular shape extending in the main scan direction. That is, as seen in the sub-scan direction, an opening width of the first opening 51b with respect to the main scan direction is larger than an opening width of the first opening 51b with respect to a height direction.

The second mirror 54 is mounted to the box frame 51 from the outside of the box frame 51 so as to close an entire region of the rectangular first opening 51b. In this embodiment, the second mirror 54 is fixed to the box frame 51 at opposite end portions with respect to the main scan direction by fixing members 61 and 61 which are leaf springs made of metal. Also as to other mirrors (53, 55, 56, 57), a similar fixing method is employed. However, the reflection member mounting method is not limited thereto, and for example, the second mirror 54 may also be fixed to the box frame 51 with an additive.

Figure 5:
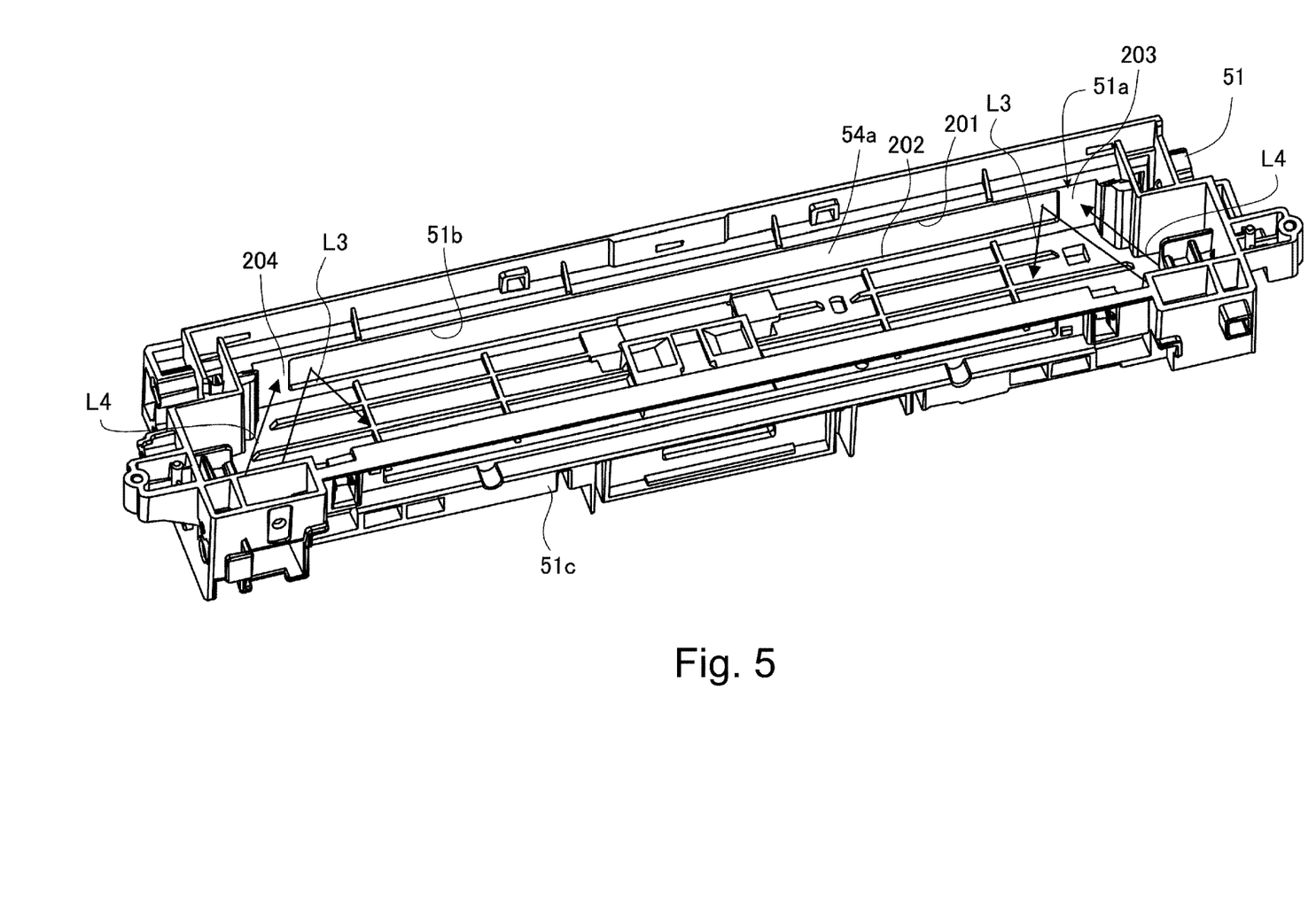
FIG. 5 is a perspective view showing the second mirror mounted on a box frame.

As shown in FIG. 5, a reflecting surface 54a of the second mirror 54 is exposed to the inside of the scanner unit 50 through the first opening 51b. Though the first opening 51b, the light beam L3 travelling along the normal optical path reaches the reflecting surface 54a of the second mirror 54, but a light beam L4 deviating from the normal optical path is configured so as not to reach the reflecting surface 54a. That is, the light beam L3 is reflected by the reflecting surface 54a and reaches the third mirror 55, but the light beam L4 is absorbed by the block box frame 51 and does not reach the third mirror 55. Incidentally, the box frame 51 is constituted by a light blocking member. Accordingly, a portion enclosing the first opening 51b of the box frame 51 has a light blocking function such that the light beam L4 deviating from the normal optical path is not permitted to reach the CCD 59a.

Figure 6:
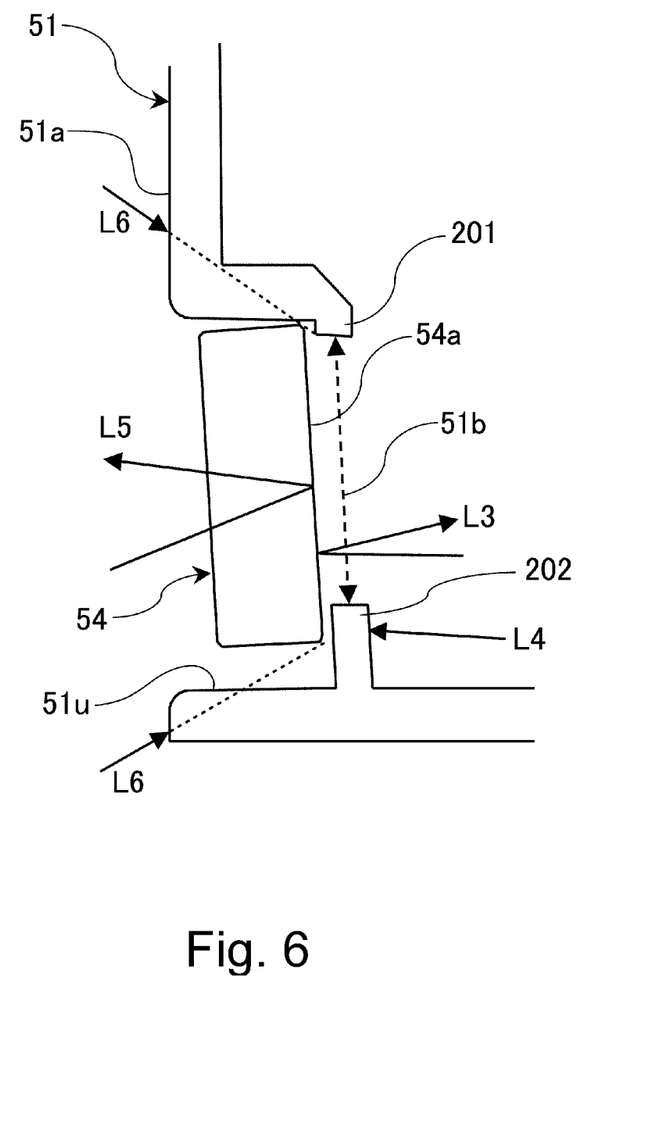
FIG. 6 is a schematic view showing a structure of the second mirror and a periphery thereof.

Further, as shown in FIGS. 5 and 6, the second mirror 54 is disposed so as to cover an entire region of the inside of the first opening 51b by the reflecting surface 54a as seen from the inside of the scanner unit 50. Specifically, the reflecting surface 54a of the second mirror 54 has a rectangular shape including the rectangular first opening 51b.

When such a constitution is employed, even in the case where a light beam L5 enters from an outside of the scanner unit 50 toward the first opening 51b, the light beam L5 is reflected to the outside of the scanner unit 50 by the reflecting surface 54a of the second mirror 54. That is, the light beam L5 does not enter the inside of the scanner unit 50 and therefore does not reach the CCD 59a. Further, as seen from the inside of the scanner unit 50, the reflecting surface 54a is enclosed by a periphery of the first opening 51b, and therefore, the light beam travelling from the outside of the scanner unit 50 toward the periphery of the first opening 51b is absorbed by the black box frame 51. Accordingly, in a constitution in which the casing of the scanner unit 50 is provided with the first opening 51b and the second mirror 54 is mounted to the scanner unit 50 from the outside of the casing, the stray light is prevented from entering the inside of the scanner unit 50 through the first opening 51b. That is, a part of the casing of the scanner unit 50 is used as a portion blocking the stray light in the neighborhood of the reflection member, whereby the stray light can be reduced by a simple constitution.

Further, in this embodiment, a constitution in which as seen from the inside of the scanner unit 50, at least a part of the periphery of the first opening 51b is configured so as to be positioned inside the periphery of the reflecting surface 54a (i.e., a peripheral wall forming the periphery of the first opening 51b overlaps with the reflecting surface 54a) is employed. That is, the peripheral wall which defines the first opening 51b and which is a part of the box frame 51 overlaps with the reflecting surface 54a of the second mirror 54 as seen from the inside of the scanner unit 50. Here, the peripheral wall defining the first opening 51b is constituted by an upper rib 201, a lower rib 202, a first side wall 203 and a second side wall 204 as shown in FIGS. 3 to 6. The upper rib 201 and the lower rib 202 are an upper peripheral wall and a lower peripheral wall, respectively, of the first opening 51b with respect to the height direction and extend along a longitudinal direction (main scan direction) of the second mirror 54. The first side wall 203 and the second side wall 204 are one side peripheral wall and the other side peripheral wall, respectively, of the first opening 51b with respect to the longitudinal direction and extend in the height direction at positions corresponding to end portions of the second mirror 54 with respect to the longitudinal direction.

Figure 10:
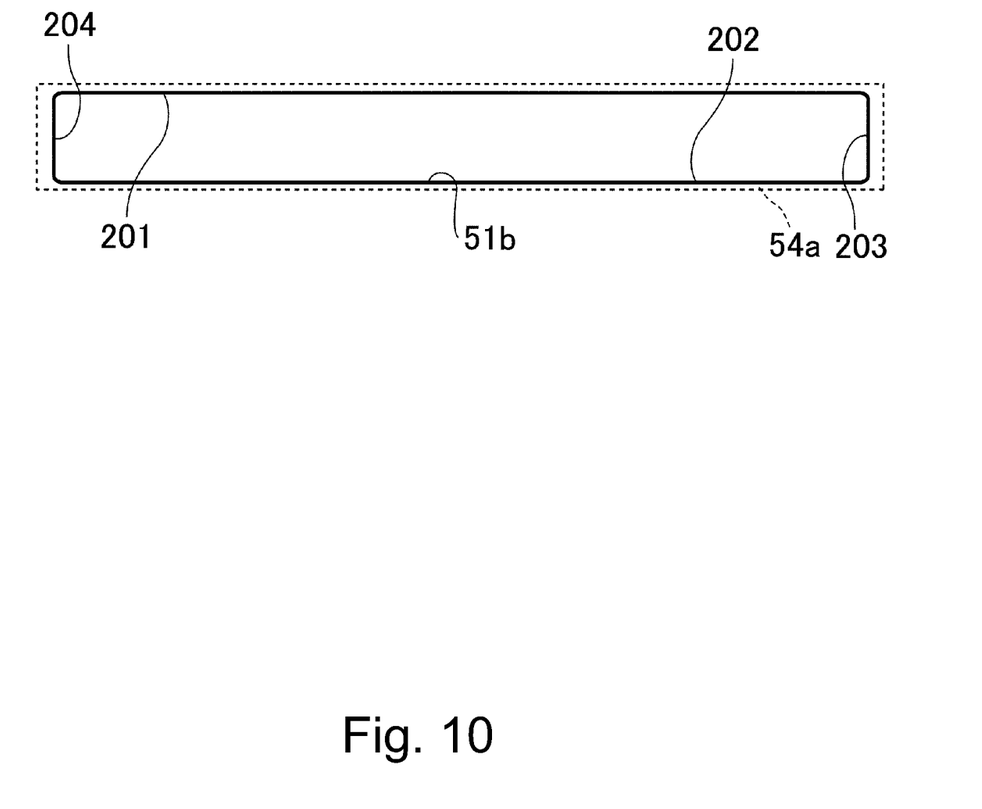
FIG. 10 is a schematic view showing a positional relationship between the second mirror and a first opening.

Each of the upper rib 201, the lower rib 202, the first scanner unit 203 and the second side wall 204 projects from an inner surface of the recessed portion 51u. Further, each of the upper rib 201, the lower rib 202, the first side wall 203 and the second side wall 204 overlaps with the reflecting surface 54a of the second mirror 54 as seen from the inside of the scanner unit 50 in a direction perpendicular to the reflecting surface 54a. FIG. 10 is a schematic view of the second mirror 54 as seen from the inside of the scanner unit 50. In FIG. 10, a dotted line represents the outer periphery of the reflecting surface 54a of the second mirror 54. In FIG. 10, a solid line represents the periphery of the first opening 51b.

By employing such a constitution, the stray light entering the inside of the scanner unit 50 through a gap between the reflecting surface 54a and the box frame 51 can be effectively suppressed. Incidentally, the reflecting surface 54a may suitably contact an outside surface of the box frame 51 at the periphery of the first opening 51b, but a minute gap between the reflecting surface 54a and the box frame 51 is permitted when the stray light can be sufficiently shielded in the gap.

As shown in FIGS. 3 and 6, the box frame 51 is provided with a recessed portion 51u constituting a mounting portion of the second mirror 54. The recessed portion 51y has a recessed shape such that the recessed portion 51u is recessed from the outside toward the inside (i.e., from left toward right in the figures) with respect to the direction (particularly, the sub-scan direction) crossing the main scan direction. The first opening 51b is formed at a bottom of the recessed portion 51u. Further, the second mirror 54 is accommodated in the recessed portion 51u in a state in which the second mirror 54 is mounted in the box frame 51.

Figure 7:
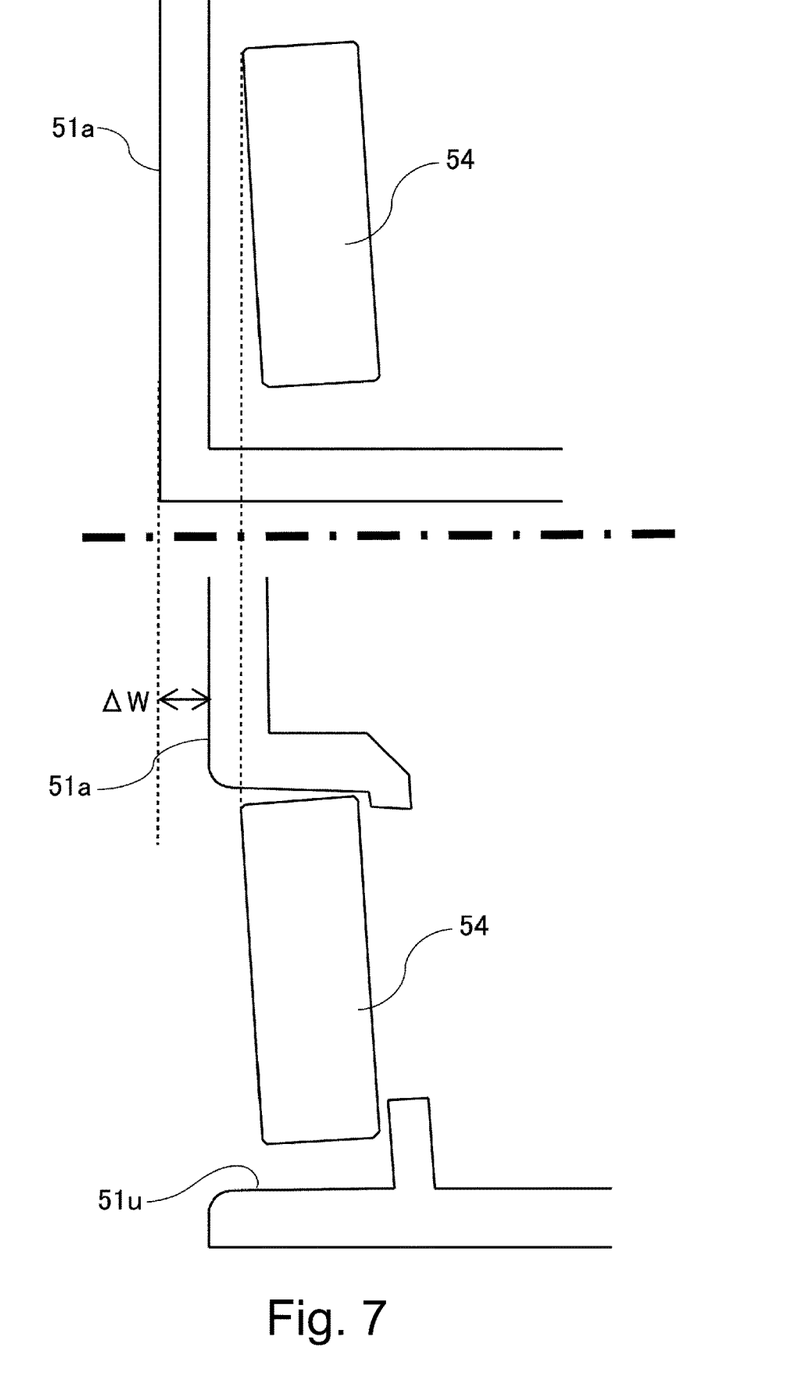
FIG. 7 is a schematic view for making comparison between a reference example and the embodiment of the present invention.

As shown as a reference example at an upper part of FIG. 7, it would be also considered that entirety of the second mirror 54 is disposed inside the casing of the scanner unit 50, but in such a constitution, the scanner unit 50 is upsized compared with this embodiment. That is, in this reference example, there is a need that the one side wall portion 51a with respect to the sub-scan direction covers the entirety of the second mirror 54 as seen in the sub-scan direction, and therefore, the side wall portion 51a and the second mirror 54 are in a positional relationship such that they are arranged in the sub-scan direction as seen in the main scan direction. Accordingly, when the side wall portion 51a is brought near to the other side wall portion, there is a need to move also the second mirror 54, but a positional change of the second mirror 54 is accompanied with a change of the normal optical path, and therefore, for example, by shortening of the normal optical path, an influence such that a desired depth of field cannot be obtained or the like arises. For this reason, in some cases, it is difficult to change the position of the side wall portion 51a for the purpose of simple downsizing.

On the other hand, as shown at a lower part of FIG. 7, in this embodiment, the second mirror 54 constitutes a side surface portion of the scanner unit 50 with respect to the sub-scan direction in cooperation with the side wall portion 51a. Accordingly, the position of the side wall portion 51a can be changed without changing the position of the second mirror 54, and even when the constitution including the normal optical path which is the same as the normal optical path in the reference example is employed, it is possible to reduce a width of the scanner unit 50 with respect to the sub-scan direction. In this embodiment shown at the lower part of FIG. 7, compared with the reference example, the side wall portion 51a is shifted toward a central side of the scanner unit 50 with respect to the sub-scan direction by ΔW. When the scanner unit 50 is downsized, it becomes possible to reduce a cost of materials and to realize improvement in durability and reduction in electric power consumption due to a reduction in a load of a driving system for moving the scanner unit 50. Further, a required space for disposing the scanner unit 50 in the ADF 1 and the main body unit 30 becomes small, and therefore, it also leads to downsizing of the image reading apparatus.

Incidentally, in the constitution in which the second mirror 54 is mounted in the first opening 51b, provided in the casing of the scanner unit 50, from the outside of the first opening 51b, accommodation of the second mirror 54 in the recessed portion 51u of the casing is also effective for suppressing the stray light. That is, as shown in FIG. 6, a part L6 of a light beam travelling toward an opposing portion between the reflecting surface 54a of the second mirror 54 and the box frame 51 is blocked by a peripheral wall of the recessed portion 51u or the side wall portion 51a at a periphery thereof (Third Mirror)

Figure 8:
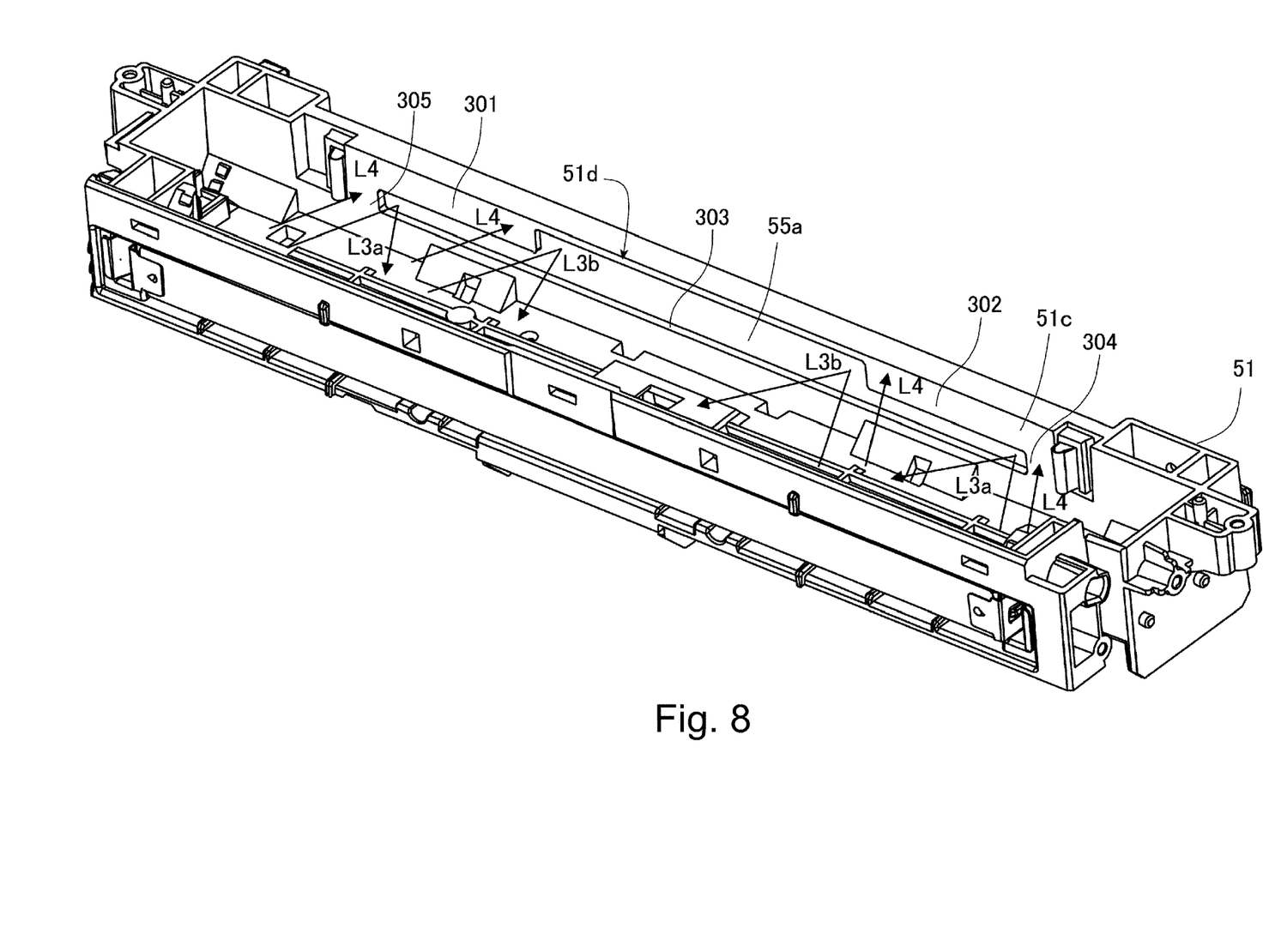
FIG. 8 is a perspective view showing a third mirror mounted on the box frame.

Next, the third mirror 55 which is another example of the reflection member will be described. The box frame 51 is provided with the second opening 51d at the other side wall portion 51c on the other side (opposite from the first opening 51b) with respect to the sub-scan direction as shown in FIG. 8. The second opening 51d is a hole penetrating through the scanner unit 50 from the inside to the outside of the scanner unit 50. As seen in the sub-scan direction, an opening width of the second opening 51d with respect to the main scan direction is larger than an opening width of the second opening 51d with respect to a height direction.

The third mirror 55 is mounted to the outside of the scanner unit 50 with respect to the second opening 51d. A mounting method of the third mirror 55 is similar to that of the second mirror 55, and the third mirror 55 is similar to that of the second mirror 55, and the third mirror 55 is mounted to the box frame 51 by a fixing member using a leaf spring made of metal, for example. Similarly as in the case of the second mirror 54, as seen from the inside of the scanner unit 50, entirety of an opening region of the second opening 51d is covered with a reflecting surface 55a of the third mirror 55. Accordingly, even in the case where the light beam enters from the outside of the scanner unit 50 toward the second opening 51d, the light beam is reflected to the outside of the scanner unit 50 by the reflecting surface 55a of the third mirror 55, and therefore, the light beam does not result in the stray light. Further, as shown in FIG. 3, the box frame 51 is provided with a recessed portion 51v which is a mounting portion for the third mirror 55, and the third mirror 55 is similar to the second mirror in that the second opening 51d is formed at the bottom of the recessed portion 51v and in that the third mirror 55 is accommodated in the recessed portion 51v.

Figure 9:
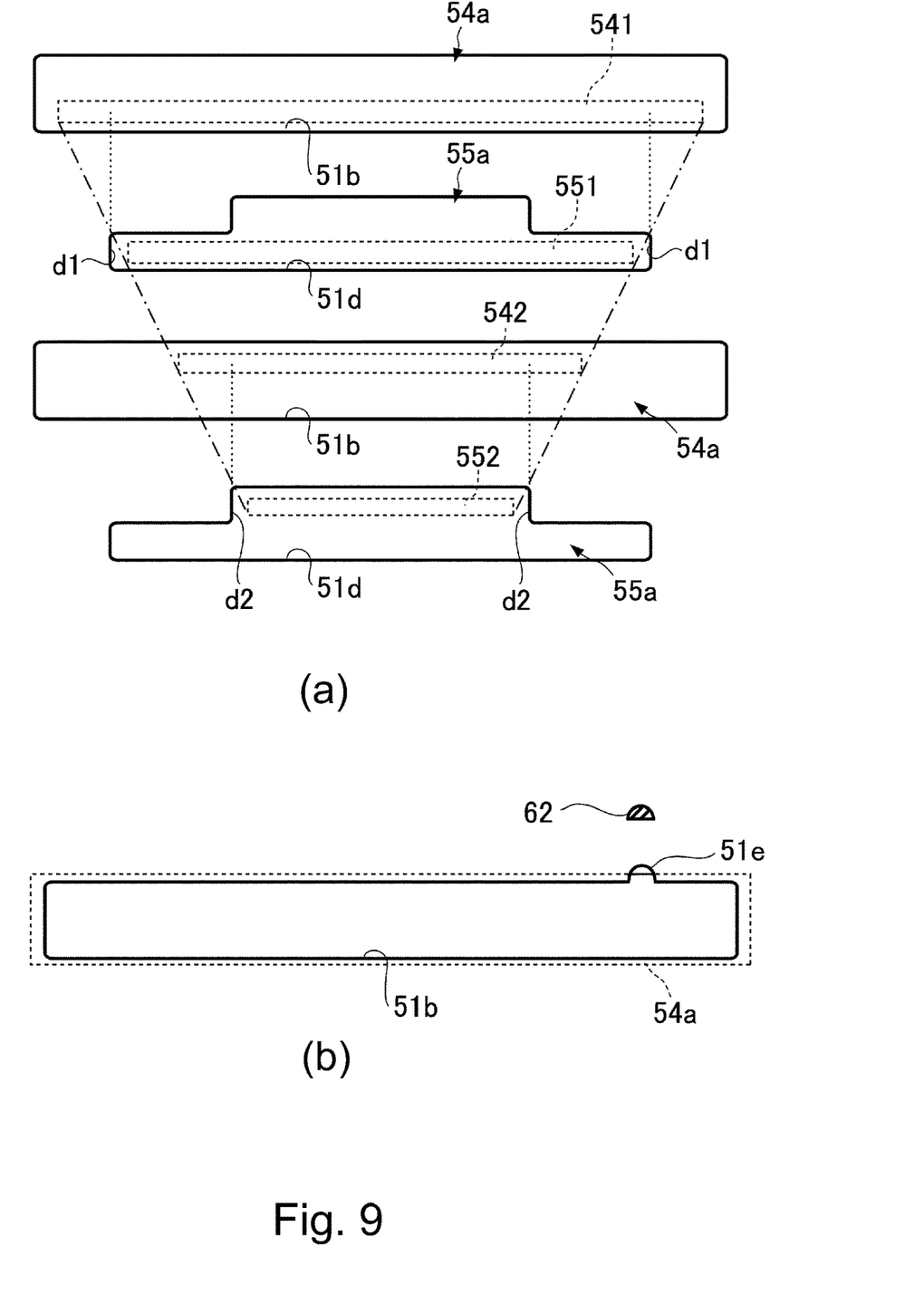

As shown in FIGS. 3 and 8, the box frame 51 is provided with a first upper rib 301, a second upper rib 302, a lower rib 303, a first side wall 304 and a second side wall 305 which constitute a peripheral wall of the second opening 51d. The first upper rib 301 and the second upper rib 302 are upper peripheral wall of the second opening 51d with respect to the height direction, and the lower rib 303 is a lower peripheral wall of the second opening 51d with respect to the height direction. Each of these ribs extends along a longitudinal direction (main scan direction) of the third mirror 55. The first side wall 304 and the second side wall 305 are one side peripheral wall and the other side peripheral wall, respectively, of the second opening 51d with respect to the longitudinal direction and extend in the height direction at positions corresponding to end portions of the third mirror 55 with respect to the longitudinal direction. Incidentally, the first upper rib 301 and the second upper rib 302 are provided on both sides with respect to the longitudinal direction in a reflection region 552 (part (a) of FIG. 9) of the third mirror 55 described later.

Each of first upper rib 301, the second upper rib 302, the lower rib 303, the first scanner unit 304 and the second side wall 305 projects from an inner surface of the recessed portion 51u. Further, each of the first upper rib 301, the second upper rib 302, the lower rib 303, the first side wall 304 and the second side wall 305 overlaps with the reflecting surface 55a of the third mirror 55 as seen from the inside of the scanner unit 50 in a direction perpendicular to the reflecting surface 55a.

Here, the opening shape of the second opening 51d is a projected shape (reversed T-shape) such that two portions different in width with respect to the main scan direction are adjacent to each other as shown in FIG. 8. That is, compared with a width (first width) with respect to the main scan direction, of a lower region (first portion) of the second opening 51d in FIG. 8, a width (second width), with respect to the main scan direction, of an upper region (second portion) of the second opening 51d is set at a small value. The reflecting surface 55a of the third mirror 55 has a rectangular shape having a size including entirety of the projected opening region.

In this embodiment, as shown in FIGS. 3 and 8, the light beam L3 travelling along the normal optical path is reflected two times between the second mirror 54 and the third mirror 55. Further, in this embodiment, a reduction optical system is employed, so that a width of the normal optical path with respect to the main scan direction is reduced as the light beam approaches the lens unit 58.

That is, as shown in part (a) of FIG. 9, widths with respect to the main scan direction, of a first reflection region 541 of the second mirror 54, a first reflection region 551 of the third mirror 55, a second reflection region 542 of the second mirror 54 and a second reflection region 552 of the third mirror 55 are narrowed in the named order. However, the first reflection region 541 of the second mirror 54 is a region of the reflecting surface 54a on which reflected light reflected by the first mirror through the normal optical path is incident. The first reflection region 551 of the third mirror 55 is a region of the reflecting surface 55a on which reflected light reflected one time by the second mirror 54 through the normal optical path is incident. The second reflection region 542 of the second mirror 54 is a region of the reflecting surface 54a on which the reflected light reflected one time by the third mirror 55 through the normal optical path is incident. The second reflection region 552 of the third mirror 55 is a region of the reflecting surface 55a on which the reflected light reflected two times by the second mirror 54 through the normal optical path is incident.

As shown in FIG. 3, in the normal optical path, the path of the light beam travelling from the second mirror 54 toward the third mirror 55 at the second time is above the path of the light beam travelling from the second mirror 54 toward the third mirror 55 at the first time. Accordingly, the second opening 51d is formed in a projected shape such that a width thereof in an upper region is narrow and a width thereof in a lower region is broad, so that it becomes possible to cover and hide an unnecessary region of the reflecting surface 55a while ensuring the reflection region of the light travelling along the normal optical path.

That is, as shown in FIG. 8, a light beam L3a reflected at the first time by the second mirror 54 and travelling along the normal optical path and a light beam L3b reflected at the second time by the second mirror 54 are incident on the reflecting surface 55a of the third mirror 55 and are reflected by the reflecting surface 55a of the third mirror 55. On the other hand, the light beam L4 entering a position deviated from the normal optical path with respect to the main scan direction is absorbed by the black box frame 51 and is not reflected by the third mirror 55, and therefore, does not reach the CCD 59a. Thus, in the constitution in which the light beam travelling along the normal optical path in the different regions (551 and 552 of part (a) of FIG. 9) of one reflecting surface is reflected two times, a shape of the opening through which the reflecting surface is exposed is made minimum necessary in expectation of a reduction in width of the normal optical path in the reduction optical system. As a result, latent stray light deviated from the normal optical path can be effectively blocked.

Incidentally, the constitution in which the shape of the opening is set in expectation of the reduction in width of the normal optical path in the reduction optical system is not limited to application to the same opening but may also be applied to a relationship between the first opening 51b and the second opening 51d. That is, as shown in part (a) of FIG. 9, in this embodiment, the width with respect to the main scan direction is narrower in the first reflection region 551 of the third mirror 55 than in the first reflection region 541 of the second mirror 54. Further, of the periphery of the second opening 51d, portions d1 and d1 which are adjacent to the reflection region 551 in the main scan direction are provided inside the first reflection region 541 of the second mirror 54 with respect to the main scan direction. As a result, the incident light deviating to the outside of the reflection region 551 with respect to the main scan direction can be effectively blocked.

Similarly, the width with respect to the main scan direction is narrower in the second reflection region 552 of the third mirror 55 than in the second reflection region 542 of the second mirror 54. Further, of the periphery of the second opening 51d, portions d2 and d2 which are adjacent to the reflection region 552 in the main scan direction are provided inside the second reflection region 542 of the second mirror 54 with respect to the main scan direction. As a result, the incident light deviating to the outside of the reflection region 552 with respect to the main scan direction can be effectively blocked.

When the second mirror 54 is a first reflection member in this embodiment, the third mirror 55 is a second reflection member in this embodiment. In this case, the reflecting surface 54a is a first reflecting surface, and the reflecting surface 55a is a second reflecting surface. When the first reflection region 541 of the second mirror 54 is a first region in this embodiment, the first reflection region 551 of the third mirror 55 is a second region, in this embodiment, disposed downstream of the first region in the reduction optical system. Further, the second reflection regions 542 and 552 of the second mirror 54 and the third mirror 55, respectively, are other examples of the first region and the second region.

Other Embodiments

In the above-described embodiment, the openings corresponding to the second mirror and the third mirror are provided in the casing of the scanner unit 50, but an opening corresponding to another reflection member may also be disposed. For example, an opening corresponding to at least one of the first mirror 53, the fourth mirror 56 and the fifth mirror 57 is provided, and a reflecting surface of a mirror mounted to the casing of the scanner unit 50 from the outside of the casing may also be exposed to the inside of the casing through the opening. Further, in the above-described embodiment, the present invention can also be carried out in the form such that the opening corresponding to either one of the second mirror 54 and the third mirror 55 is omitted. Also, in these embodiments, a constitution in which as seen from the inside of the casing, the reflecting surface is enclosed by the periphery of the opening is employed, so that the stray light can be reduced by a simple structure.

Incidentally, in the above-described embodiment, description was made using the constitution in which as seen from the inside of the casing, the entire region of the first opening 51b is covered with the reflecting surface 54a of the second mirror 54 and the entire region of the second opening 51d is covered with the reflecting surface 55a of the third mirror 55. However, for example, as shown in part (b) of FIG. 9, the first opening 51b and the second mirror 54 may also be in a positional relationship such that a part (51e) of the reflection region of the first opening 51b projects to the outside of the reflecting surface 54a of the second mirror 54. In this case, for example, after the second mirror 54 is mounted to the box frame 51, a gap between the projected portion 51e of the opening region and the reflecting surface 54a is filled with a member 62 such as a rubber, whereby a light blocking property at the first opening 51b is ensured. Even in this case, the first opening 51b is provided so as to enclose the reflecting surface 54a as seen from the inside of the casing, so that at least in a portion other than the projected portion 51e, a light blocking function can be imparted to the casing of the image reading unit.

Further, as regards the reflection member held on the outside of the casing with respect to the opening, on a surface of the reflection member opposite from the reflecting surface, a light blocking layer may also be formed by paint or a coating film which is high in a light blocking property to visible light beam. In this case, most of the light beam L5 (FIG. 6) travelling from an outside of the scanner unit 50 toward the opening is absorbed or reflected by the light blocking layer and does not reach the reflecting surface, different from the above-described embodiment. However, also by such a constitution, the stray light can be reduced by a simple structure.

Further, in the above-described embodiment, the image reading apparatus 103 assembled with the image forming apparatus was described, but the present invention is also applicable to the image reading apparatus capable of being used singly. Further, the image reading unit explained in the above-described embodiment is not limited to the image reading unit for reading the image information from the sheet as the original, but may also be applicable as an apparatus for reading the image information for another purpose. For example, the image reading unit can be used an apparatus for reading an image, formed on the recording material, in order to adjust image density and to adjust a position and distortion of the image. Further, the image reading unit is also applicable to apparatuses, reading and using the image information, such as an authenticity discrimination apparatus of paper money and an apparatus for automatically sorting baggages in a distribution warehouse.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-046512 filed on Mar. 13, 2019 and 2019-215856 filed on Nov. 28, 2019, which are hereby incorporated by reference herein in their entirety.

What is claimed is:
1. An image reading unit for reading an image of a document comprising:
an illumination unit configured to illuminate an object with light;

a reflection mirror configured to reflect a reflected light from the document illuminated with the light by said illumination unit;

a converting unit configured to convert photoelectrically light reflected by the reflection mirror; and an optical box configure to hold the reflection mirror and the converting unit, the optical box including a space through which is passed the light reflected by the reflection mirror therein, wherein said optical box is provided with a through hole which has a shape such that a first portion having a first width with respect to a main scan direction and a second portion having a second width narrower than the first width with respect to the main scan direction are adjacent to each other in a direction crossing the main scan direction, and wherein said reflection mirror closes the through hole of said optical box from an outside of said optical box.

2. An image reading unit according to claim 1, wherein an entire region of an inside of said through hole is covered with a reflecting surface of the reflection mirror as seen from an inside of said optical box.

3. An image reading unit according to claim 1, wherein at least a part of a periphery of said through hole is positioned inside a periphery of a reflecting surface of the reflection mirror as seen from an inside of said optical box.

4. An image reading unit according to claim 1, wherein said through hole and said reflection member extend along the main scan direction, wherein said optical box is provided with a recessed portion recessed from an outside toward an inside of said optical box in a direction crossing the main scan direction, wherein said through hole is formed at a bottom of said recessed portion, and wherein said reflection mirror is held by said optical box in a state in which said reflection mirror is accommodated in said recessed portion.

5. An image reading unit according to claim 1, wherein said reflection mirror is a part of a reduction optical system in which a width of an optical path with respect to the main scan direction is narrowed when the light travels toward said converting unit along a normal optical path, and wherein said reflection mirror and said through hole are disposed so that when the light travels toward said converting unit along the normal optical path, the light reflected by a reflecting surface of the reflection mirror at the first portion of said through hole is then reflected by the reflecting surface at the second portion of said through hole.

6. An image reading unit according to claim 1, wherein when said through hole is a first through hole, said reflection mirror is a first reflection mirror, and a reflecting surface of the first reflection mirror is a first reflecting surface, said image reading unit further comprising:

a second reflection mirror including a second reflecting surface for reflecting the light and configured to form an optical path for guiding the reflected light from the document to said converting unit, and a second through hole provided in said optical box, wherein said second reflection mirror closes the second through hole of said optical box from an outside of said optical box.

7. An image reading unit according to claim 6, wherein said first reflection mirror and said second reflection mirror are a part of a reduction optical system in which a width of an optical path with respect to the main scan direction is narrowed when the light travels toward said converting unit along a normal optical path, and are disposed so that the light reflected into a first region of a first reflecting surface of the first reflection mirror enters a second region of a second reflecting surface of the second reflection mirror along the normal optical path.

8. An image reading unit according to claim 1, further comprising a platen on which a document is placed, wherein the illumination unit illuminates, with light, the document placed on said platen.

9. An image reading unit according to claim 1, wherein the optical box includes a wall portion having the through hole, wherein the reflection mirror is provided outside the wall portion, and wherein the reflection mirror is arranged such that at least a part of the reflection mirror overlaps with the wall portion as viewed in a direction perpendicular to a reflecting surface of the reflection mirror.

10. An image reading unit according to claim 1, further comprising fixing members which are configured to fix the reflection mirror to the optical box, wherein said reflection mirror is fixed to the optical box at both end portions of said reflection mirror with respect to a main scan direction by said fixing members.

11. An image reading unit according to claim 1, further comprising a lens unit configured to guide the reflected light reflected by the reflection mirror to the converting unit, wherein said lens unit is disposed below the reflection mirror with respect to a vertical direction.

12. An image reading unit configured to read an image of a document, comprising:

a platen on which a document is placed;

an illumination unit configured to illuminate the document placed on the platen with light;

a first reflection mirror configured to reflect a light from the document illuminated with the light by said illumination unit;

a second reflection mirror configured to reflect the light which has been reflected by the first reflection mirror;

a converting unit configured to convert photoelectrically light reflected by the first reflection mirror and the second reflection mirror; and an optical box configured to hold the first reflection mirror, the second reflection mirror and the converting unit, the optical box including a space through which is passed the light reflected by the first reflection mirror and the second reflection mirror therein, and be movable in parallel to the platen, wherein said optical box is provided with a first wall portion and a second wall portion opposing the first wall portion in a moving direction of said optical box, wherein said first wall portion is provided with a first through hole, wherein said second wall portion is provided with a second through hole, wherein said first reflection mirror closes the first through hole of said optical box from the outside of said optical box, and wherein said second reflection mirror closes the second through hole of said optical box from the outside of said optical box.

13. An image reading unit according to claim 12, wherein one of said first through hole and said second through hole has a shape such that a first portion having a first width with respect to a main scan direction and a second portion having a second width narrower than the first width with respect to the main scan direction are adjacent to each other in a direction crossing the main scan direction.

14. An image reading unit according to claim 12,
wherein the first reflection mirror is arranged such that the at least a part of the first reflection mirror overlaps with the first wall portion as viewed in a direction perpendicular to a reflecting surface of the first reflection mirror.

15. An image reading unit according to claim 12, further comprising: fixing members which are configured to fix the first reflection mirror to the optical box,
wherein said first reflection mirror is fixed to the optical box at both end portions of said first reflection mirror with respect to a main scan direction by said fixing members.

16. An image reading unit according to claim 12,
wherein said first wall portion is provided with a recessed portion recessed from an outside toward an inside of said optical box in the moving direction of said optical box,
wherein said first through hole is formed at a bottom of said recessed portion, and
wherein said first reflection mirror is held by said optical box in a state in which said first reflection mirror is accommodated in said recessed portion.

17. An image reading unit according to claim 12, further comprising: a lens unit configured to guide the reflected light reflected by the first reflection mirror and the second reflection mirror to the converting unit,
wherein said lens unit is disposed below the first reflection mirror and the second reflection mirror with respect to a vertical direction.

* * * * *